(12) United States Patent
Poupon

(10) Patent No.: US 7,988,393 B2
(45) Date of Patent: Aug. 2, 2011

(54) FASTENER ASSEMBLY FOR TRANSPORT VEHICLE

(75) Inventor: Cédric Poupon, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 13 days.

(21) Appl. No.: 12/560,659

(22) Filed: Sep. 16, 2009

(65) Prior Publication Data

US 2010/0067999 A1 Mar. 18, 2010

(30) Foreign Application Priority Data

Sep. 17, 2008 (FR) ...................................... 085 6243

(51) Int. Cl.
*B61D 45/00* (2006.01)
(52) U.S. Cl. ........................................ 410/105; 410/102
(58) Field of Classification Search .................. 410/101, 410/103, 77, 97, 96, 102, 106, 116, 117
See application file for complete search history.

(56) References Cited

U.S. PATENT DOCUMENTS

| 3,677,195 | A |   | 7/1972  | Prete, Jr.              |
|-----------|----|---|---------|--------------------------|
| 4,124,740 | A  | * | 11/1978 | Dubin ............... 429/104 |
| 4,199,704 | A  | * | 4/1980  | Varshneya et al. ...... 313/623 |
| 4,708,549 | A  | * | 11/1987 | Jensen ............... 410/105 |
| 6,260,813 | B1 |   | 7/2001  | Whitcomb                 |
| 2008/0145171 | A1 | * | 6/2008 | Smetz ............... 410/101 |

FOREIGN PATENT DOCUMENTS

| DE | 10147292 A1    | 5/2003 |
| DE | 102007001806 A1 | 7/2008 |
| GB | 1153823 A      | 5/1969 |

OTHER PUBLICATIONS

French Search Report dated Apr. 27, 2009.

* cited by examiner

*Primary Examiner* — Glenn Dayoan
*Assistant Examiner* — Sunsurraye Westbrook
(74) *Attorney, Agent, or Firm* — Perman & Green, LLP

(57) ABSTRACT

This invention relates to a fastener assembly that has a rail (1) and a fastener device (6) that can be installed in a transport vehicle, characterized in that a rail head (2) is coated with a layer (3) of alumina with polytetrafluoroethylene seal and that at least a portion (5) of the fastener device in contact with the rail head is made of metal coated with a layer of polymers (7).

10 Claims, 1 Drawing Sheet

FASTENER ASSEMBLY FOR TRANSPORT VEHICLE

CROSS-REFERENCE TO RELATED APPLICATIONS

This application claims priority to French Application No. 08 56243 filed on Sep. 17, 2008, the disclosure of which is incorporated herein by reference in its entirety.

BACKGROUND

1. Field

This invention relates to a fastener assembly with a rail designed to be mounted in a transport vehicle, such as an aircraft, a train, etc., and a fastening device for joining an element such as a seat to said rail. More precisely, the invention relates to means for protecting the rails, especially against corrosion.

BRIEF DESCRIPTION OF RELATED DEVELOPMENTS

It is known in the field of aeronautics how to fasten elements such as passenger seats, furnishings, freight, etc., to rails which themselves are mounted by being fastened to the floor of an aircraft. Most often, these rails are made of an aluminum alloy. These rails deteriorate rapidly because of corrosion, principally in humid areas such as the galley, the toilets, and the door entrances. This corrosion affects principally the upper flange of the seat rails in contact with the fasteners of the devices to be fastened, positioned in the throat of said rails.

The rails of the aircraft are presently protected by a layer of unsealed alumina deposited by anodic sulfuric acid oxidation and coated with paint. The paint has very good adhesion as long as it stays in the pores of the alumina layer.

Two principal factors are at the origin of the corrosion problems encountered on such rails. First, cadmium-plated steel fasteners are placed in the throat of the rails to support the seats and others. In addition, this rail and fastener assembly is subjected to an aggressive environment. In this situation, several phenomena of chemical and mechanical origin are responsible for damaging the rails. In particular, such damage is due to corrosion by confinement and by galvanic coupling between the aluminum of the rail and the steel of the fastener, to friction during assembly and disassembly between rail and fastener entailing scratching and scaling to the point of complete removal of the protection, and to contact wear between rail and fastener under vibrational conditions leading to superficial shearing of protections.

Another problem is that the layer of alumina is deposited by being sprayed onto the rail, which leads to production of a layer of variable thickness depending on whether the area of the rail in question is more or less accessible. Thus, in general, a substantial layer of alumina is observed on the outer surface of the upper flange of the rail, and a much thinner layer on the throat of said rail, even though this is the most highly stressed area of the rail.

In other respects, the present protective layer contains chromates, which can be harmful to human health.

SUMMARY

The aspects of the disclosed embodiments seek to furnish a protective coating that can be used on fastening rails that has neither chromate nor cadmium in compliance with public health requirements, and that shows increased resistance to corrosion. Another objective of the invention is to reduce scratches on the rail and/or contact wear between the rail and the fastening device, so as to reduce the risks of corrosion of said rail.

To this end, it is proposed to use a rail coated with a layer of alumina with polytetrafluoroethylene seal, at least in the area intended to be in contact with the fasteners. The alumina layer is obtained by hard anodic oxidation. The polytetrafluoroethylene seal provides an improvement of the wear resistance of the alumina layer. The fasteners themselves are covered with a layer of polymeric material such as a layer of polyamide 11, and particularly that sold under the trade name RILSAN. Then, when contact is made between the rail, most often made of aluminum alloy, and the fastener, most often made of steel, the protective layers contact one another, reducing the risks of corrosion of the rail. The protective layers can be obtained by immersion of the part in a suitable bath, which provides a protective layer of uniform thickness over the entire surface in question. Thickness means the dimension of the protective layer extending radially on the surface in question.

Accordingly, the subject matter of the present application is a fastener assembly that has a rail and a fastener device that can be installed in a transport vehicle, characterized in that a rail head of said rail is coated with a layer of alumina with polytetrafluoroethylene seal and that at least a portion of the fastener device in contact with the rail head is made of metal coated with a layer of polymers.

The rail may be made of an aluminum alloy. The fastener device or at least the portion of the fastener device in contact with the rail may be made of steel, and particularly of cadmium-plated steel.

It is advantageous for the layer of polymers coating the portion of the fastener device in contact with the rail to be a layer of polyamides, preferentially polyamide 11.

The transport vehicle may be an aircraft or a train, for example, intended to transport people, in which the rails permit passenger seats to be fastened. The fastener device is then integral with a lower face of a seat. Most often, the lower face of the seat after it is fastened is in contact with the external surface of the upper flange of the rail. The lower face of the seat may also advantageously be covered with a layer of polymers. Of course it is possible to proceed in the same way with any furnishing that is to be mounted fastened to a rail, and particularly the refrigerating and heating cabinets used in aircraft.

According to examples of embodiments, the fastener assembly may have all or parts of the following supplementary characteristics:

- the alumina layer with polytetrafluoroethylene seal has a thickness of 35±5 μm;
- the layer of polymers has a thickness of 200±20 μm;
- the layer of polymers covers an anticorrosion precoat;
- the anticorrosion precoat consists of electrolytic zinc;
- the anticorrosion precoat has a thickness less than 20 μm and preferentially is between 3 and 4 μm.

DESCRIPTION OF THE FIGURES

The disclosed subject matter will be better understood by reading the following description and examining the single FIGURE that accompanies it. It is given by way of example and does not limit the invention in any way.

The single FIGURE shows a transverse partial cross section of a seat rail and an associated seat fastener.

DESCRIPTION OF THE EMBODIMENTS

Figure 1:
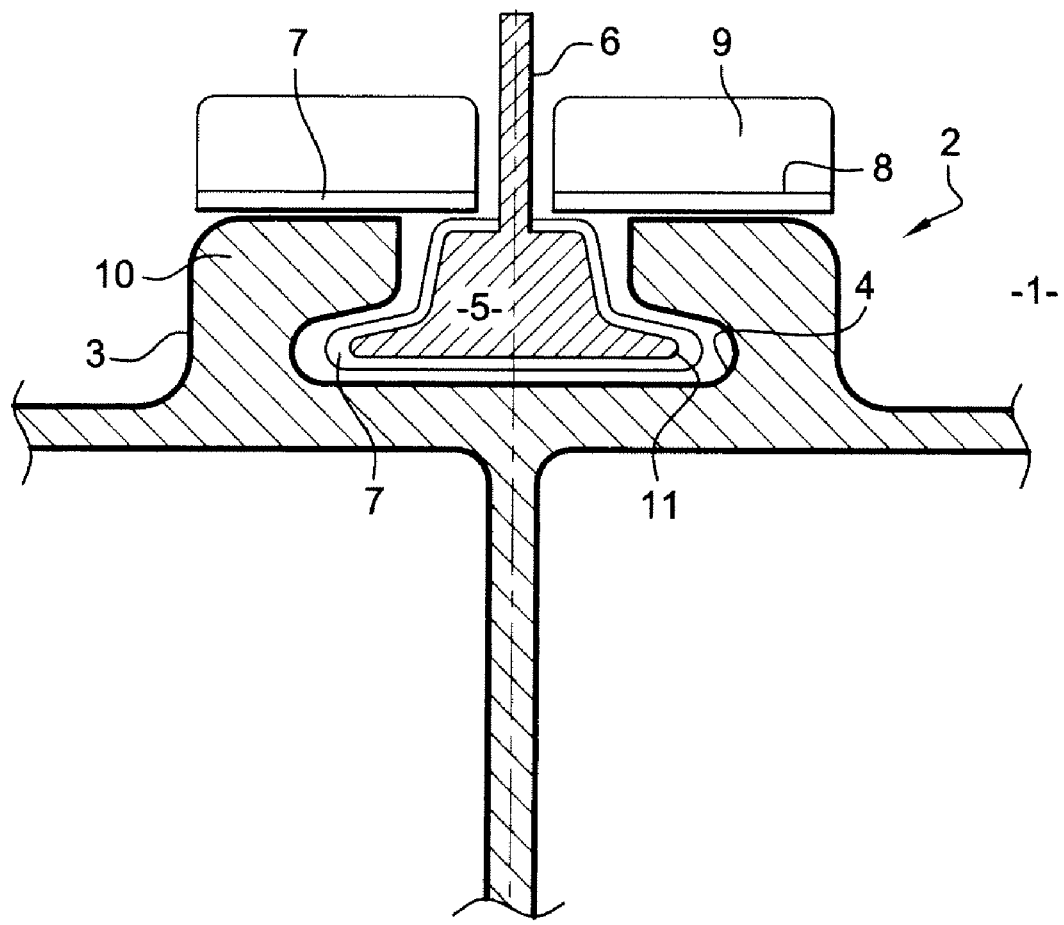

The rail 1 has a head 2 to which a seat (not shown) is fastened. More precisely, the rail head 2 has a slide groove 4, or throat, in which is lodged a base 5 of a fastener device 6 integral with a lower face 8 of a seat. Of course the fastener device 6 in combination with the rail head 2 can also provide for any other element to be fastened to said rail 1.

In accordance withone embodiment, the rail head 2 is coated with an anticorrosion protective layer 3, i.e. a layer of alumina sealed with polytetrafluoroethylene.

The thickness of the anticorrosion layer 3 is preferably 35±5 µm. The layer 3 with a uniform thickness over the entire surface of the rail head 2 is obtained by a known method by immersion of the rail head 2 in a succession of baths at room temperature, with the last bath containing particles of polytetrafluoroethylene. It is possible to immerse the entire rail assembly 1 or only the rail head 2, or a more or less sizable portion of the rail 1 that carries the rail head 2.

The protective anticorrosion layer 3 thus obtained has a constant thickness and is devoid of chromates. In other respects, it has a hardness of 350 to 370 Hv under 50 g, depending on the thickness, allowing it to resist shock. It also has increased resistance to scratching, compared with the coating of the prior art, which provides for avoiding the creation of a surface favorable to corrosion. In addition, the protective layer 3 pursuant to the invention provides substantial lubrication due to the polytetrafluoroethylene, which increases the anticorrosion barrier function of the protective layer 3.

In accordance withone embodiment, the base 5 of the fastener device 6 is itself covered with a coating 7 of polyamide 11, so that the entire surface of the rail 1 in contact with the fastener device 6 corresponds to a contact between a layer 3 of alumina sealed with polytetrafluoroethylene and a layer 7 of polyamide 11. Of course any other polymer can be used to produce the layer 7, and especially any other polyamide, for example polyamide 66. The polyamide 11 is applied by immersion in a fluidized bed, which leads to homogeneous deposition and accordingly to the formation of a layer of constant thickness, preferably of the order of 200 µm±20 µm over the entire outer surface of the portion of the fastener device 6 immersed in said bath.

The layer 7 of polyamide 11 has little hardness, a low coefficient of friction, high wear resistance and impact resistance, and forms a good anticorrosion barrier to galvanic coupling.

In the example shown, in other respects, a lower face 8 of the foot of the seat 9, in contact with the protective layer 3 of alumina sealed with polytetrafluoroethylene covering the upper flange 10 of the rail head 2, is also covered with a layer 7 of polyamide 11, in order also to protect this contact area against wear and corrosion.

If the fastener device is made of oxidizable material, an outer surface of the fastener device is preferably coated with an anticorrosion precoat 11 of electrolytic zinc. For example the anticorrosion precoat 11 is a lamellar zinc coating with a thickness of less than 20 µm, so that said precoat does not interfere mechanically in the linkage between the rail 1 and the seat.

The combination of these two protective layers 3, 7 provides for the effective protection of the rail assembly 1 and the fastener device 6 against corrosion.

More precisely, since the polyamide 11 is relatively soft and the alumina with polytetrafluoroethylene seal is relatively hard, the risks of scratching the surface of the rail are reduced, and accordingly also the risks of corrosion in these sensitized areas.

In the contact area between the rail 1 and the seat, the presence of polyamide 11 beneath the feet 9 of the seat permits easier sliding of said seats along the rails, and eliminates the risk of the paint peeling. In addition, the polyamide 11 serves as a shock absorber.

In addition, this combination of coatings by protective layers of different natures is in accord with the rule of kinematic lengths according to which the abilities to accommodate the smallest kinematic length are tied to the mechanical properties. Thus, for good behavior of the fastener assembly, the material constituting the smallest kinematic length, i.e. the fastener device 6 and the feet 9 of the seat in our precise case, must have the least hardness, which is satisfied with the coating of polyamide 11.

The invention claimed is:

1. A fastener assembly comprising a rail and a fastener device that can be installed in a transport vehicle, wherein a rail head is coated with a layer of alumina with polytetrafluoroethylene seal and that at least a portion of the fastener device in contact with the rail head is made of metal coated with a layer of polymers.

2. The fastener assembly pursuant to claim 1, wherein the layer of alumina sealed with polytetrafluoroethylene has a thickness of 35 ±5 µm.

3. The fastener assembly pursuant to claim 1, wherein the layer of polymers is a layer of polyamide 11.

4. The fastener assembly pursuant claim 1, wherein at least the portion of the fastener device in contact with the rail head is made of steel.

5. The fastener assembly pursuant to claim 1, wherein the layer of polymers has a thickness of 200±20 µm.

6. The fastener assembly pursuant to claim 1, wherein the layer of polymers covers an anticorrosion precoat.

7. The fastener assembly pursuant to claim 6, wherein the precoat contains electrolytic zinc.

8. The fastener assembly pursuant to claim 6, wherein the precoat has a thickness of less than 20 µm and preferably is between 3 and 4 µm.

9. The fastener assembly pursuant to claim 1, wherein the rail is designed to be fastened to a seat, with the fastener device being integral with a lower face of a seat.

10. The fastener assembly pursuant to claim 9, wherein the lower face of the seat in contact with the rail head is coated with a layer of polymers.

\* \* \* \* \*

UNITED STATES PATENT AND TRADEMARK OFFICE
CERTIFICATE OF CORRECTION

| | | |
|---|---|---|
| PATENT NO. | : 7,988,393 B2 | |
| APPLICATION NO. | : 12/560659 | |
| DATED | : August 2, 2011 | |
| INVENTOR(S) | : Poupon | |

It is certified that error appears in the above-identified patent and that said Letters Patent is hereby corrected as shown below:

Title page, Item (57) Abstract:
Delete the Abstract and insert -- A fastener assembly has a rail and fastener device that can be installed in a transport vehicle. A rail head is coated with a layer of alumina with polytetrafluoroethylene seal and at least a portion of the fastener device in contact with the rail head is made of metal coated with a layer of polymers. -- therefor.

Signed and Sealed this
Twenty-first Day of February, 2012

David J. Kappos
*Director of the United States Patent and Trademark Office*